United States Patent
Shnell

[11] Patent Number: 5,697,218
[45] Date of Patent: Dec. 16, 1997

[54] SYSTEM FOR GEOTHERMAL PRODUCTION OF ELECTRICITY

[76] Inventor: James H. Shnell, 1371 Smokewood Dr., Santa Ana, Calif. 92705

[21] Appl. No.: 486,704

[22] Filed: Jun. 7, 1995

[51] Int. Cl.⁶ ............................................ F03G 7/00
[52] U.S. Cl. .......................... 60/641.2; 60/659; 422/212
[58] Field of Search ......................... 60/641.2, 652, 60/659, 731, 39.05; 422/212

[56] References Cited

U.S. PATENT DOCUMENTS

| | | | |
|---|---|---|---|
| 2,240,347 | 4/1941 | Page, Jr. et al. | 422/212 X |
| 2,259,487 | 10/1941 | Payne | 422/212 X |
| 3,858,397 | 1/1975 | Jacoby . | |
| 4,002,729 | 1/1977 | Abraham et al. . | |
| 4,085,795 | 4/1978 | Gill . | |
| 4,192,371 | 3/1980 | Derouette et al. . | |
| 4,372,386 | 2/1983 | Rhoades et al. . | |
| 4,642,987 | 2/1987 | Csorba et al. | 60/641.2 |
| 4,927,856 | 5/1990 | Elion . | |
| 4,937,052 | 6/1990 | Takahashi et al. . | |
| 5,052,482 | 10/1991 | Gondouin . | |
| 5,108,550 | 4/1992 | Pinaire et al. | 422/212 X |
| 5,143,150 | 9/1992 | Johnston | 60/641.2 X |
| 5,202,194 | 4/1993 | VanBerg, Jr. . | |
| 5,255,740 | 10/1993 | Talley . | |
| 5,271,215 | 12/1993 | Guillet | 60/39.5 |

FOREIGN PATENT DOCUMENTS

| | | |
|---|---|---|
| 0511180A1 | 10/1992 | European Pat. Off. . |
| 59-222225 | 12/1984 | Japan . |
| 60-035182 | 2/1985 | Japan . |
| 63-032110 | 2/1988 | Japan . |
| 63-084629 | 4/1988 | Japan . |
| 2058935 | 4/1981 | United Kingdom . |

*Primary Examiner*—Hoang Nguyen
*Attorney, Agent, or Firm*—Knobbe, Martens, Olson & Bear, LLP

[57] ABSTRACT

A system for the generation of electricity from geothermal energy that is less expensive, more efficient, and avoids dealing with undesirable byproducts, is disclosed. The system of the present invention relies on using endothermic reactions at the bottom of a well to capture and store the geothermal heat, and exothermic reactions at the top of the well to release the heat stored within the products of the endothermic reactions. In the preferred embodiment, the endothermic reaction is the decomposition of water. To induce the endothermic reaction as well as to harvest and separate the resulting products, a catalytic device is used where each type of product selectively diffuses into its individual conduit. The endothermic products undergo the exothermic reaction in a combustion turbine, and the products of the exothermic reaction are immediately condensed in a condenser. In the preferred embodiment the condenser condenses steam into liquid water to be returned down the well, thus creating a closed system.

27 Claims, 6 Drawing Sheets

SYSTEM FOR GEOTHERMAL PRODUCTION OF ELECTRICITY

FIELD OF THE INVENTION

This invention relates to the production of electricity by the use of geothermal heat. Geothermal heat acts on a device at the bottom of the well and induces an endothermic reaction where the products of the endothermic reaction are brought to the surface and undergo an exothermic reaction for providing energy to be converted to electricity by a turbine.

BACKGROUND OF THE INVENTION

Current systems for the production of electricity from geothermal energy rely on the heat in the earth's crust to vaporize water or another liquid; the vapor is then used in a turbine to generate electricity. The geothermal heat is generally brought to the surface via wells that tap into reservoirs of steam or brine that circulate at depths in the crust sufficient to collect a substantial amount of heat. See U.S. Pat. No. 3,786,858 (1974), for example.

However, modern steam turbines operate most efficiently at very high temperatures, substantially higher than the temperatures achieved in the steam or brine reservoirs generally used to produce geothermal electricity. Further, the heat that is present at depths within the earth that are attainable (for practical purposes) is not sufficiently concentrated. Geothermally-powered steam turbines are therefore less efficient. They are also somewhat limited in operation by the fact that the heat removed from the earth cannot be stored for later use; it must be used immediately or lost.

In addition, the brine or steam that is brought to the surface loses a significant amount of its heat (generally 25% to 30%) as it comes to the surface. Brine or steam from geothermal reservoirs is generally accompanied by hydrogen sulfide and other undesirable gases, which must be captured before they escape into the atmosphere. Because the temperature of the brine or steam is relatively low, a large amount must be transported to the surface, and so large-diameter wells, which are expensive to drill, are required. Moreover, the brine and steam that is brought to the surface is often highly mineralized and corrosive. If it is used directly in a turbine, the turbine must be modified to withstand these conditions, which further deceases the efficiency of the system. In the alternative, the brine or steam may be used to boil another fluid through a heat exchanger in a binary generating system; this alternative also loses some efficiency through the heat exchanger.

Another problem that can be caused by the minerals in the brine or steam is scaling in the wells, which can build up over time and must be removed. The brine presents problems of disposal after it has been used, unless it is reinjected into the reservoir, which requires expensive pumping and may contaminate the reservoir. Even if the brine is reinjected, some of the salts may drop out of solution as the brine is cooled prior to reinjection; these salts must be disposed of, and they may be radioactive or otherwise hazardous.

The most significant limitation, however, is that there are very few reservoirs that are both large enough and hot enough to make geothermal exploitation an economical prospect, and so the conventional method for geothermal production of electricity is very limited in application.

Research is currently being conducted into the possibility of drilling into hot, dry rock ("HDR") and injecting water to create a geothermal reservoir which can then be tapped to generate electricity; however, such systems face many of the same problems as conventional geothermal systems, and are more expensive. Prior art HDR systems require two wells to be bored, an injection well for injecting the water to create a reservoir, and a separate production well for continuously bringing the steam to the surface. Employing only one well for injecting water and retrieving steam would not be efficient since either too much energy would be lost when the injected water passes the rising steam, or the steam would be retrieved only intermittently so that energy would not be supplied to the generator on a continuous basis.

The injection of water into the rock requires an amount of energy that represents a significant fraction of the energy that the system can produce, thus lowering the efficiency of the system. Also, a certain percentage of the water that is injected is lost into fractures in the rock, and is not returned up the production well. The greater the amount of pressure that is used to drive the water from the injection well to the production well, the more water is lost, because the higher pressure at the injection well causes the cracks to dilate there, as does the colder water, which causes the rock to contract. The dilation is needed at the production well, where it accelerates the release of the energy in the rock. Tests have shown that short-term shutting-in of the production well, by increasing dilation there, improves overall production from the well.

The predominant technology used for the generation of electricity is the combustion of hydrocarbons and the conversion of the resultant heat to electricity. Up until the last decade, most electricity was generated by the combustion of coal to produce steam. Recently, approximately half of all new electric generating capacity has taken the form of combustion turbines burning oil or natural gas and using the power to create electricity through a direct link to a generator. In a system using a "combined cycle," the heat from the combustion turbine exhaust is used to create steam, which then generates additional electricity in a steam turbine. However, each of the foregoing combustion processes releases substantial amounts of nitrogen oxides, creating air pollution and the potential for acid rain. They also produce carbon dioxide, thus contributing to global warming. If coal or oil is used as the fuel, sulfur dioxide is also released into the atmosphere, which may produce additional acid rain, and particulates may be released as well. The combustion of coal also produces ash, which must be disposed of properly. Moreover, these processes all consume limited natural resources. Also, a combustion turbine uses a significant amount of the energy it creates to compress the air that it takes in, in order to sustain its operation.

Other technologies used to produce electricity include nuclear, hydroelectric, solar and wind generation. Nuclear generation is expensive and presents serious issues of disposal and contamination. Hydroelectric, solar and wind generation face timing and geographic limits in terms of the areas in which they are effective and may require extensive collection systems or otherwise involve environmental impacts. Also, solar and wind generation are significantly more expensive than conventional technology.

Much of the electricity currently produced is generated by condensing steam turbines; fuel is combusted and the exhaust is released into the atmosphere, while the heat produces superheated steam. The steam passes through a steam turbine generator, generating electricity, at the end of which the steam is condensed. The drop in pressure due to condensation at the outlet end of the turbine permits the turbine to turn more freely, but the overall process is still less than forty percent efficient, in part due to the need to exchange the combustion heat into steam energy. Also, a significant amount of energy is lost through the exhaust of the combustion process.

A steadily increasing portion of new generating capacity installed in recent years is in the form of combustion turbines. Combustion turbines use the energy released from combustion to turn the shaft on a turbine, which then turns an electrical generator. The turbine requires a large volume of air for the combustion, which requires filtering and, often, heating or cooling, and introduces dirt into the turbine and consumes energy. The exhaust is released into the atmosphere, and it carries a significant amount of energy as well as pollution with it. In addition, a combustion turbine uses a significant amount of energy to compress the inlet air, only 16% (or less) of which is oxygen used in the combustion process.

Only recently have combustion turbines achieved efficiencies approximating 40% while thus operating in "simple cycle." Efficiencies approximating 50% can be achieved by combustion turbines operating in "combined cycle," in which the heat of the exhaust from the combustion turbine is exchanged into steam energy, which is then used to operate a steam turbine generator. This steam is not, however, as superheated as the steam that is ordinarily used in steam turbine generators and consequently the steam cycle of a combined cycle system is less efficient than a simple steam turbine.

The steam turbine and the combustion turbine (whether simple cycle or combined cycle) each cause pollution due to the release of products and byproducts of combustion into the atmosphere. They each lose efficiency because they release as exhaust a significant amount of the energy from the combustion. The steam generator and the combined cycle combustion turbine generator each lose efficiency due to the exchange of heat into steam pressure.

SUMMARY OF THE INVENTION

The present invention is a system for the efficient generation of electricity from geothermal energy wherein one or more substances is transported down a well to a depth at which geothermal heat (whether from brine or steam reservoirs or hot, dry rock) is sufficient to cause an endothermic reaction to occur among such substances. The reaction products are then transported separately to the surface, where the products undergo the reverse reaction, and energy from this exothermic reaction is converted into electrical energy, whether through a steam turbine, a combustion turbine, or a combination of the two. (In certain circumstances, a fuel cell might take the place of the turbine(s).)

The endothermic reaction at the bottom of the well may proceed slowly, at a relatively low temperature, with the products being created and collected over a large area; the exothermic reaction will proceed rapidly, producing a high temperature, thus effectively concentrating the geothermal heat to make the production of electricity more efficient. In the preferred embodiment of the present invention, a catalytic device is used having one or more conduits, such as tubes or porous rods, for collecting one or more of the products of the endothermic reaction and transporting such product separate from the other product(s). The conduits are nested inside a ceramic material permeable by the products, where the ceramic material is surrounded by a thin film or mesh of a catalyst (a zeolite, for example). Although the injected water automatically undergoes the endothermic reaction upon exposure to the heat at the bottom of the well, the use of a catalyst on the surface of the catalytic device is desirable to accelerate the reaction. The tubes or conduits have a cross-sectional configuration that is effective for collecting the intended products.

One conduit or set of conduits is made from a material which is permeable by one of the products of the endothermic reaction, but which is not permeated by or which repels (chemically, by higher pressure, or otherwise) the other product(s) of the endothermic reaction as well as the reactant(s). Another conduit or set of conduits receives the remaining product(s). The tubes will be assembled in a fashion to promote the separation of the products by absorbing them as they form on the surface of the catalyst. In the simplest form, the catalytic device is a conduit composed of a catalyst that is permeable by only one of the products. The other products and remaining reactants, if any, would return from the bottom of the well by a separate conduit. In the preferred embodiment, the catalyst is porous as to all products of the endothermic reaction. A selective material that is porous as to only one product surrounds the tubes or porous conduits that are closest to the surface of the catalyst, so that such product is removed from the catalyst; the innermost tube or porous conduit will collect the remaining product. If the decomposition of water is the desired endothermic reaction, the catalyst will be a suitable transition metal such as palladium, for example. The catalyst material is a thin film or mesh surrounding the porous ceramic material that the conduits for the products are embedded in. In the preferred embodiment, a series of outer conduits absorb hydrogen, and an inner conduit absorbs oxygen. The inner conduit may be simply a hole in the porous ceramic material that the oxygen diffuses through. The series of conduits for receiving exclusively hydrogen may, for example, be made from palladium or other material which is porous enough to allow hydrogen to pass through, but not oxygen.

As the respective tubes absorb the respective products, the endothermic reaction with the assistance of the catalyst will effectively decrease the total number of molecules outside the catalytic device as the products diffuse into their respective porous conduits. Since the porous catalytic device effectively removes the endothermic products out of the reservoir, the elevated pressure in the reservoir will not oppose the endothermic reaction. In fact, the elevated pressure at the bottom of the well promotes the endothermic reaction. The optimal design for a particular catalytic device will depend on the nature of the endothermic reaction, its reactant(s) and products, the nature of the catalyst used, and the conditions under which the reaction occurs.

A catalytic device constructed in accordance with the present invention will promote the endothermic reaction and, simultaneously, collect and separate the products of that reaction. The system of the present invention must have a mechanism for collecting the products of the endothermic reaction in order to transport them to the top of the well. The present invention will so collect the products and, at the same time, segregate them in order to preclude unwanted reactions between the products or of a product with some other material. The invention will also cause the elevated pressures in the well to support the endothermic reaction, instead of opposing it. The elevated pressures do not oppose the reaction since the porous conduits receive the reaction products.

Alternatively, instead of using a catalytic device to catalyze the endothermic reaction, any of several reactions could be used to cause the endothermic reaction. The preferred endothermic reaction is the decomposition of water into hydrogen and oxygen; the subsequent exothermic reaction will then produce pure water, which can be transported back down the well for another cycle. However, the temperature ordinarily necessary for the thermal decomposition of water is not present in the earth's crust at a depth that is currently attainable by practical means. Thus, the decomposition of water may be achieved through a sequence of reactions having sufficiently lower activation energies (such as $4H_2O + 2SO_2 + 2I_2 \rightarrow 2H_2SO_4 + 4HI$ and $2H_2SO_4 \rightarrow 2SO_2 + 2H_2O + O_2$ and $4HI \rightarrow 2I_2 + 2H_2$, which results in a net reaction of $2H_2O \rightarrow 2H_2 + O_2$) to permit the decomposition of water to occur under the conditions obtained in the well. The products of the decomposition are then gathered and transported separately to the surface, where they may be stored (separately) until used in the exothermic reaction. The product of the exothermic reaction is then returned to the well in a closed cycle.

Another reaction that can be used, the "water gas" reaction, $CH_4 + H_2O \rightarrow CO + 3H_2$, occurs spontaneously at 800° C. However, most such reactions may require oxygen from the air to complete the exothermic reaction and (whether or not they so require air) they may produce, in the course of the subsequent exothermic reaction, carbon dioxide, nitrogen oxides, or some other undesirable product. In addition, efficiency may be lost due to the need to use heat exchangers or other means to handle certain reaction products.

Electricity generating systems constructed in accordance with the invention offer advantages over existing generating technologies. The primary advantage over existing geothermal systems is that the system of the present invention absorbs a greater amount of heat per unit volume through the endothermic reaction than can be captured by the heated brine or steam. For example, the decomposition of a given mass of water captures five to six times the amount of heat that is represented by the same mass of steam. Also, higher temperatures (and therefore greater efficiency) can be obtained in the exothermic reaction and the generation of electricity.

In addition, since brine is not required by the invention, the use of geothermal energy to generate electricity by way of the present invention is not limited to those locations having economically viable subterranean reservoirs of heated brine. Since brine is not required, no efficiency need be lost to heat exchangers in order to avoid mineral deposits in the generating mechanism. So long as the products of the endothermic reaction are kept separated, none of the energy gained at the bottom of the well is lost in bringing the energy to the surface. The products of the reactions will not be corrosive to the equipment. No toxic gases will be released to the atmosphere. The products of the endothermic reaction convey the energy in a much smaller volume, and therefore the borehole drilled for creating the well may have a much smaller diameter and so is less expensive to bore. In addition, only one well is required instead of two since the injected water will not react with the endothermic reaction products that are drawn up through separate conduits within the well. Since any injection of water will be made at the "production" well, much of the pumping energy now used to force the water from the injection well through the fractures to the production well will be saved, water loss into the rock will be lower, and well performance should be improved in the manner indicated by the shutting-in tests of existing geothermal production wells.

Moreover, mineral deposits will not build up and present problems in the well. The reinjection or disposal of the brine will not be required. To the extent that the endothermic reaction is (on a net basis) the decomposition of water, no pollution will be created, let alone released into the atmosphere, and there will be no waste of limited resources. The products of the endothermic reaction can be stored and used when electricity is needed. If the products of the endothermic reaction come out of the ground at high pressure, they can be stored and used at high pressure, avoiding the need to compress them prior to the exothermic reaction (a step that requires significant energy in combustion turbines) or, if the exothermic reaction does not require compression, the excess pressure from the well can be used to generate additional energy.

The preferred embodiment of the present invention also comprises the combination of a "combustion" turbine which is fueled by two or more reactants that combine in an exothermic reaction, the product(s) of which can be condensed, and a condenser. In the preferred embodiment, the reactants are hydrogen and oxygen which are produced by the endothermic reaction at the bottom of the well. The hydrogen acts as a fuel and combusts when mixed with the oxygen to create steam. Following the final power stage in which the exothermic reaction is harnessed by the "combustion" turbine, the product(s) of the exothermic reaction is/are condensed, thus reducing the amount of back-pressure on the combustion turbine and increasing its efficiency. The preferred combination turbine would be fueled with hydrogen and oxygen, the combustion of which would produce steam, to be condensed at the outlet end of the turbine. Such a combination turbine could be used as a part of the system of the present invention or could operate on other fuel sources. Alternatively, the system of the present invention could also employ either a standard combustion turbine or a boiler combined with a steam turbine or a fuel cell.

Combination turbines constructed in accordance with the invention offer several advantages. By condensing the product(s) of the exothermic reaction, the combination turbine will reduce the back-pressure of the exhaust from the combustion turbine and increase the pressure drop across the final combustion stages of the turbine. Advantageously, the power turbine section of the combination turbine generally has more power stages than the power turbines of prior art combustion turbines, thus harnessing more of the energy from the exothermic reaction and increasing the efficiency of the turbine and simultaneously making it easier to condense the steam at the outlet of the turbine. In addition, the combination turbine will not require a heat exchanger to generate steam, thus increasing its efficiency. To the extent that condensation creates a "closed loop" (i.e., all of the product(s) are condensed or otherwise captured) it will be possible to make productive use of some of the energy that is otherwise lost with the exhaust, thus further increasing efficiency. To the same extent, the combination turbine will avoid releasing pollution into the atmosphere. In addition, if the combination turbine is fueled entirely from captive sources, as in the preferred model using hydrogen and oxygen, the dirt and other impurities that are taken into most prior art combustion turbines (causing wear and tear and compelling regular cleanings) is avoided, and the energy that is used by prior art combustion turbines to condense, filter and heat or cool inlet air is conserved. Furthermore, unlike solar or hydropower systems, the combination turbine of the present invention can, depending on the volume of storage for the reactants, operate on demand, as a peaking unit or as a baseload unit.

BRIEF DESCRIPTION OF THE DRAWINGS

The preferred embodiments of this invention, illustrating all its features, will now be discussed in detail. These embodiments depict the novel and non-obvious system for the geothermal production of energy of this invention shown in the accompanying drawings, which are included for illustrative purposes only. These drawings include the following figures, with like numerals indicating like parts.

DETAILED DESCRIPTION OF THE DRAWINGS

Figure 1:
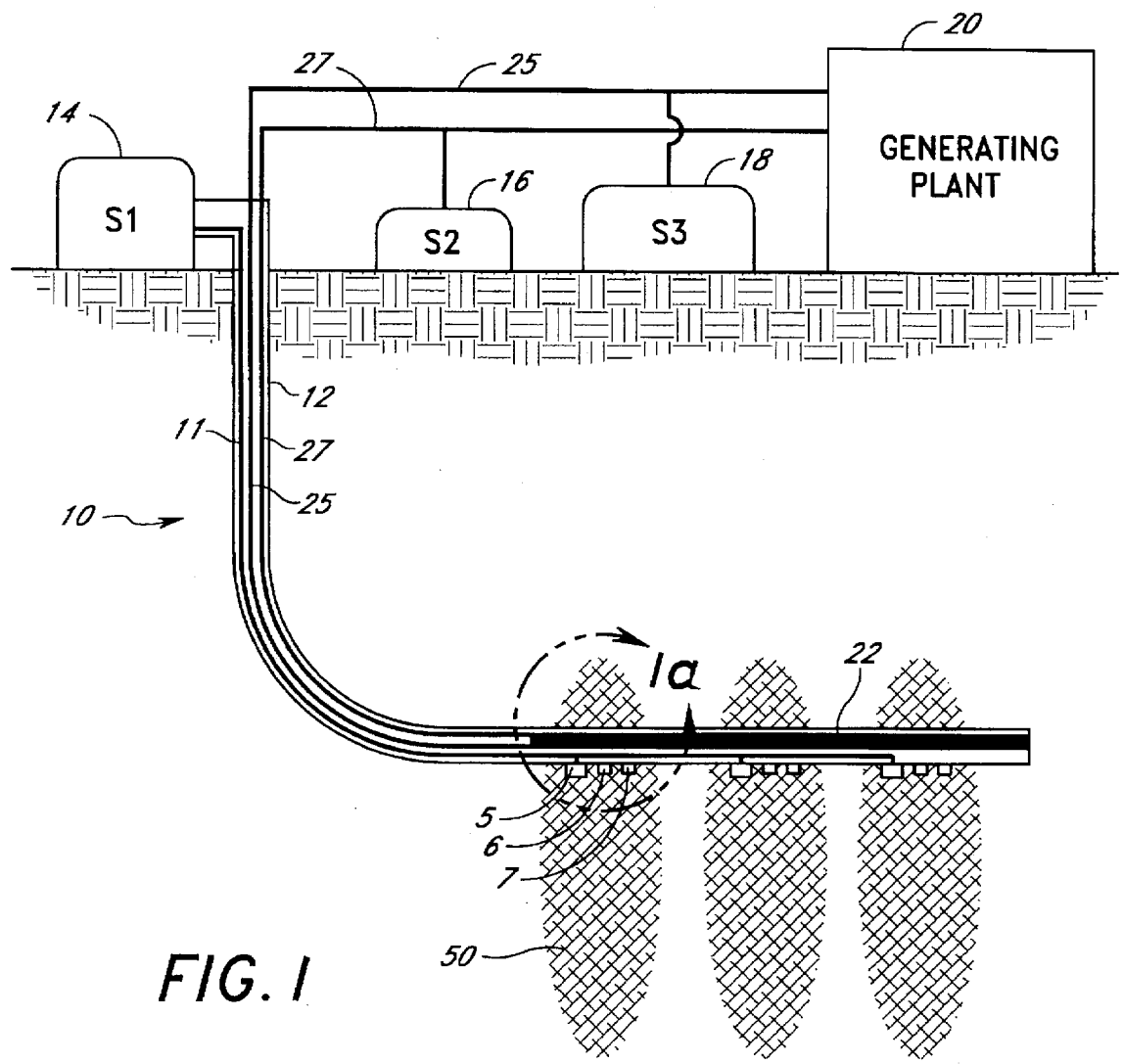
FIG. 1 is a cross-sectional schematic view of the preferred embodiment of the system of the present invention.

FIG. 1 illustrates the geothermal generating system 10 of the present invention. With the present invention, a viable hot, dry rock system can now be efficiently used for converting geothermal heat to electricity. The present invention avoids the problems of pollutants, is less expensive, and greatly improves the operating efficiency of such geothermal systems. The system comprises a well 12 coupled to storage tank 14, shown as S1 in FIG. 1, for storing the reactants that are to be used for the endothermic reaction that occurs at the bottom of well 12 in fracture zones 50 of hot, dry rock. It is contemplated that system 10 of the present invention may also be used at other locations deep within the earth, such as reservoirs, where the geothermal heat is hot enough to induce the desired endothermic reaction. Catalytic device 22, which catalyzes the desired endothermic reaction resides within the bottom section of well 12 with porous conduits 24 and 26 (shown in FIG. 6) of catalytic device 22 coupled to standard conduits 25 and 27, respectively, which extend up through well 12. Standard conduits 25 and 27 transport the products of the endothermic reaction to the earth's surface, where the products may be stored in storage tanks 18 and 16, respectively, or delivered immediately to generating plant 20 for conversion to electricity. The endothermic reaction products are transported separately through porous conduits 24 and 26, and then through conduits 25 and 27 of the present invention to the combination turbine of the present invention, where in one embodiment of the present invention, the energy is released from the products upon undergoing an exothermic reaction as will be explained in greater detail below. In turn, this energy is converted to electrical energy. Due to the high pressure environment at the bottom of well 12 created by the column of water in well 12, the elevated pressure forces the endothermic products through catalytic device 22, into porous conduits 24 and 26, and up conduits 25 and 27.

Figure 1A:
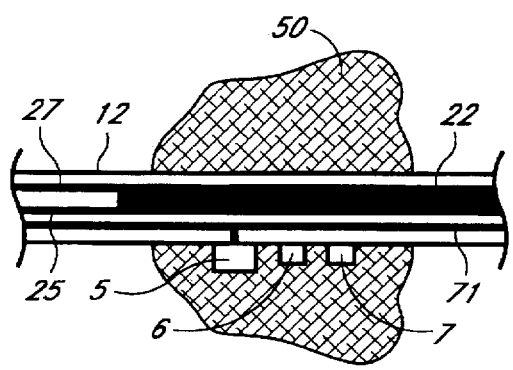
FIG. 1a is an enlarged cross-sectional schematic view of the bottom of the well of the system of the present invention as shown in FIG. 1.
Figure 2:
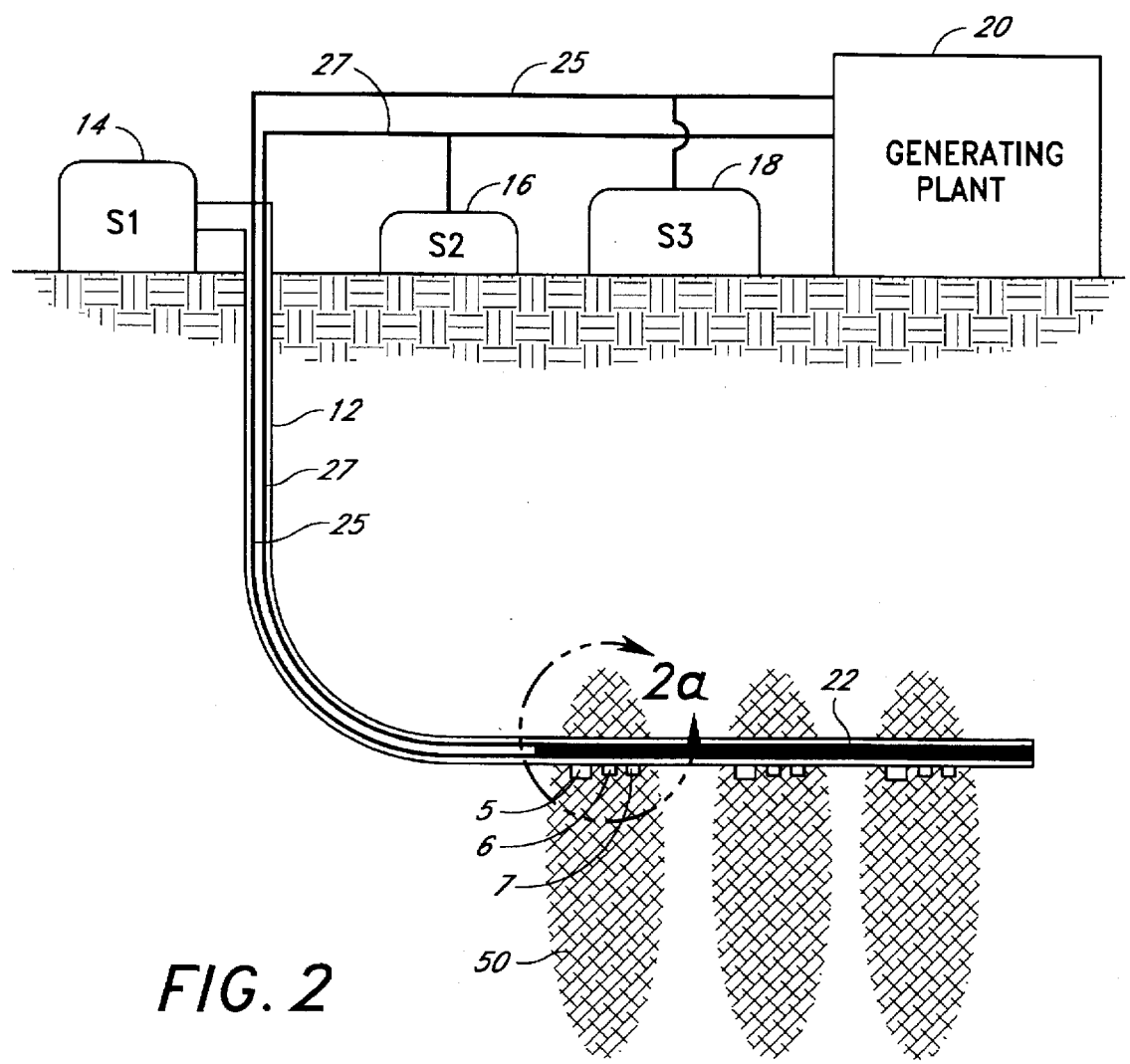
FIG. 2 is a cross-sectional schematic view of the preferred embodiment of the present invention illustrating an alternate means of releasing water into the hot, dry rock.
Figure 2A:
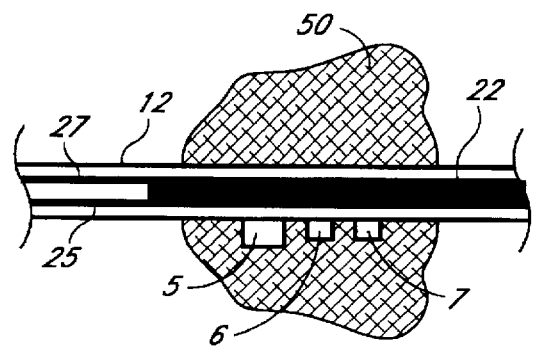
FIG. 2a is an enlarged cross-sectional schematic view of the bottom of the well of the system of the present invention as shown in FIG. 2.

In the preferred embodiment the endothermic reactant stored in storage tank 14 is water, which is decomposed to hydrogen and oxygen at the bottom of well 12. Storage tank 14 maintains a column of water within well 12. A separate conduit 11 coupled to storage tank 14 is also sent down to the bottom of well 12 where water from water conduit 11 may be released from well 12 to fracture zone 50 through one-way valve 5 in well 12. To create fracture zones 50, water is injected into the hot, dry rock to dilate cracks and thereby access a larger volume of rock for a circulating medium. Since a percentage of water is lost into the fractures in the rock, water will be needed to resupply the fracture zone from time to time through one-way valve 5. In the preferred embodiment, the water injected into fracture zone 50 comes from separate water conduit 11 rather than the column of water within well 12 since the water to be injected into fracture zones 50 is more easily controlled by using conduit 11 rather than using the water within well 12. Pressure gauge 6 and temperature gauge 7 on the exterior of well 12 as shown in FIG. 1a, measure the pressure and temperature in the fracture zone 50 so as to notify an operator when to inject more water into fracture zone 50. FIGS. 2 and 2a illustrate the alternate embodiment of using water directly from the water circulating within well 12 instead of using a separate conduit 11. In the alternate embodiment, a valve 5 and pressure gauge 6 and temperature gauge 7 are also used in a similar manner as described above with respect to FIGS. 1 and 1a. The preferred embodiment of injecting water is used, however, in situations where the pressure in the fracture zone 50 is greater than the pressure inside well 12. In such a case, conduit 11 is used with a pump (not shown) at the surface.

The endothermic reaction takes place in the horizontal section of well 12 which is surrounded by fracture zones 50 as shown in FIG. 1. Instead of having a horizontal section, the well 12 may be angled downward. The heat generated from fracture zones 50 raises the temperature on the casing of well 12 which correspondingly raises the temperature of the water within well 12. In this environment, catalytic device 22 is able to induce the endothermic reaction and separate the endothermic products.

Instead of being one continuous section as shown in FIG. 1, catalytic device 22 may be divided into a plurality of serially connected sections which are coupled together with a comparatively flexible tubing. Such a scheme is advantageous since the flexible tubing, such as standard pipe for example, would be less costly than a continuous section of catalytic device 22 which is made substantially of ceramic and also, the flexibility is advantageous due to the need for directional drilling to access the fracture zones 50. Headers could be used to connect the flexible tubing to each catalytic device section where the tubing would be located in areas where the fracture zones 50 did not exist. The flexible tubing, such as pipe, should be impermeable to the endothermic products and able to withstand temperatures up to 800° C.

Figure 6:
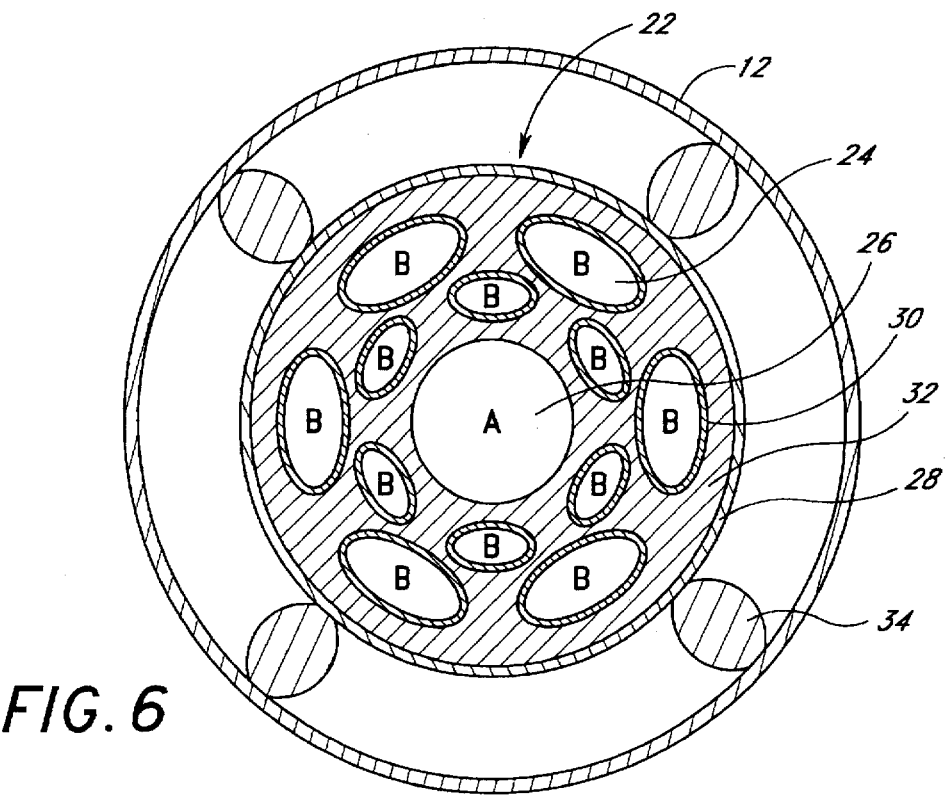
FIG. 6 is an enlarged cross-sectional view taken along line 2—2 of FIG. 1, showing the elements of the catalytic device of the system of the present invention.

Referring to FIG. 6, a cross-section of the bottom of well 12 is shown where catalytic device 22 is shown in greater detail. Catalytic device 22 is supported within well 12 by a plurality of rods 34 to allow the endothermic reactants to circulate around catalytic device 22. Rods 34 may also be knobs or any other support device as is readily understood by those of skill in the art. As shown in FIG. 6, catalytic device 22 comprises porous ceramic material 32, with porous conduit 26 substantially within the center of ceramic material 32. Ceramic material 32 is selected to have a structure which would be relatively permeable to the endothermic products, but at the same time, would not encourage the reformation of the reactants within ceramic material 32.

Substantially surrounding porous conduit 26 and within ceramic material 32 are a series of porous conduits 24. Porous conduits 24 and 26 may be either tubes or conduits and may be circular in cross-section, or a different design may be more effective in collecting the products. Porous conduit 26 may be defined by a hole in substantially in the center of ceramic material 32. Porous conduit 24 is made from a material that is porous as to only one of the endothermic products. In the preferred embodiment where water is decomposed, porous conduit is made from a suitable transition metal, such as palladium, which is porous to hydrogen, but not oxygen. Porous conduit 26 is labelled in FIG. 6 by the letter A to represent that porous conduit 26 receives endothermic product A, and porous conduits 24 are labelled by the letter B to represent that porous conduits 24 receive endothermic product B. In the preferred method, product A may refer to oxygen, for example, and product B may refer to hydrogen.

Thin film or mesh catalyst 28 on catalytic device 22 is provided at the bottom of well 12 to accelerate the series of reactions to produce the hydrogen and oxygen products. Thus, the water at the bottom of well 12 reacts with the catalyst 28 on the surface of catalytic device 22. Ceramic material is designed to be permeable to the endothermic reaction products so that the products will diffuse to their respective porous conduits 24 and 26. Porous conduit 24 and 26 are assembled within ceramic material 32 to promote the separation of the products by absorbing them as they form on catalyst 28.

As shown in FIG. 6, each porous conduit 24 is made from a selective material 30 which has the property of being porous only with respect to product B. Thus, product B of the endothermic reaction permeates ceramic material 32 and is collected by the series of porous conduits 24 after product B diffuses through selective material 30. Since selective material 30 is specifically designed to block the entry of product A, as product A diffuses through ceramic material 32, product A maneuvers around the locations of selective material 30 and through the passages between the series of porous conduits 24 until product A diffuses into porous conduit 26. As a result, the products A and B of the endothermic reaction are kept separate in their respective conduits, 26 and 24. Some of product B may, in fact, diffuse past porous conduits 24 and eventually into porous conduit 26 where this amount of product B reacts with product A. This reaction does not have any significant deleterious effect on the system. In the case of the decomposition of water for example, porous conduit 26 is filled with oxygen and a small amount of water vapor that can be dehydrated from the oxygen at the surface.

Figure 3:
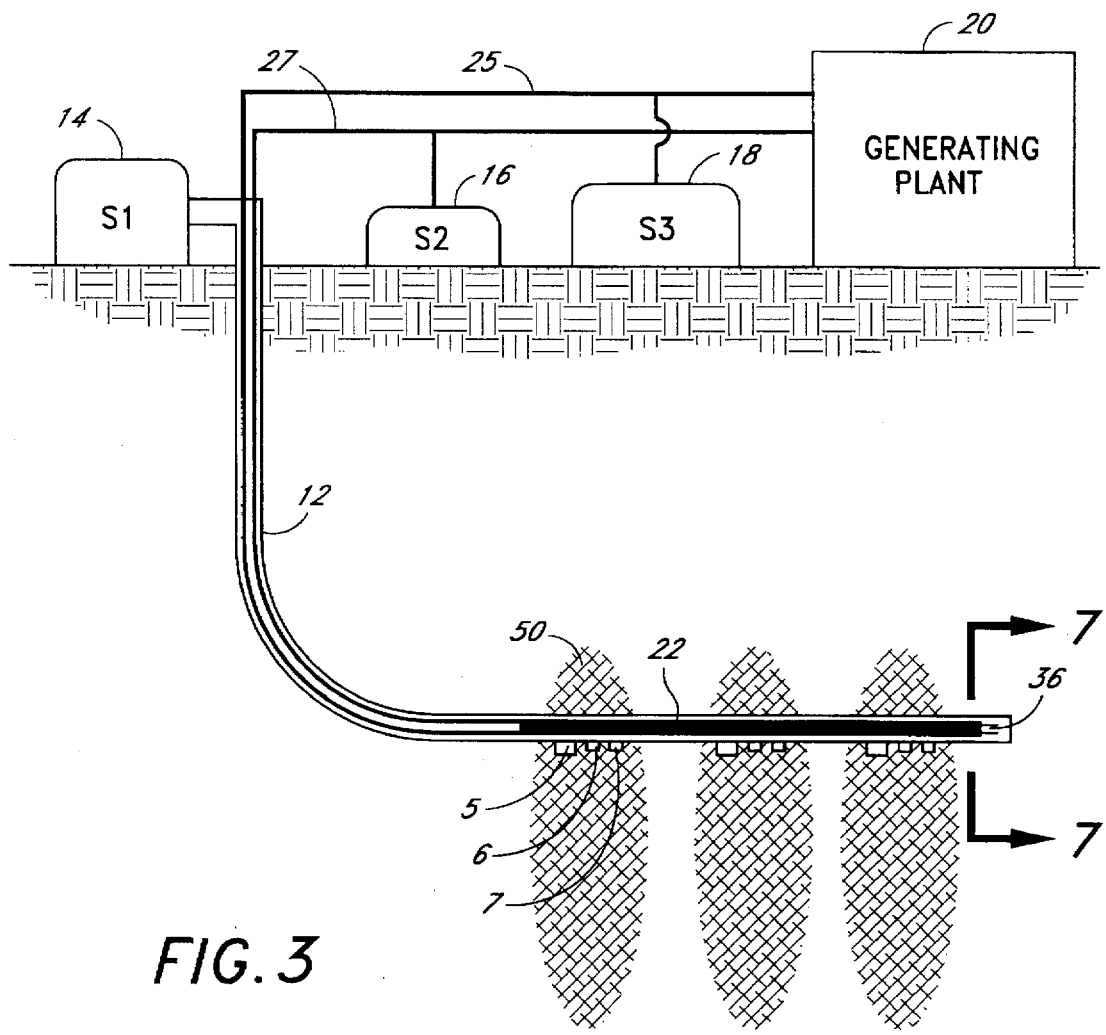
FIG. 3 is a cross-sectional schematic view of a first alternate embodiment of the system of the present invention.
Figure 7:
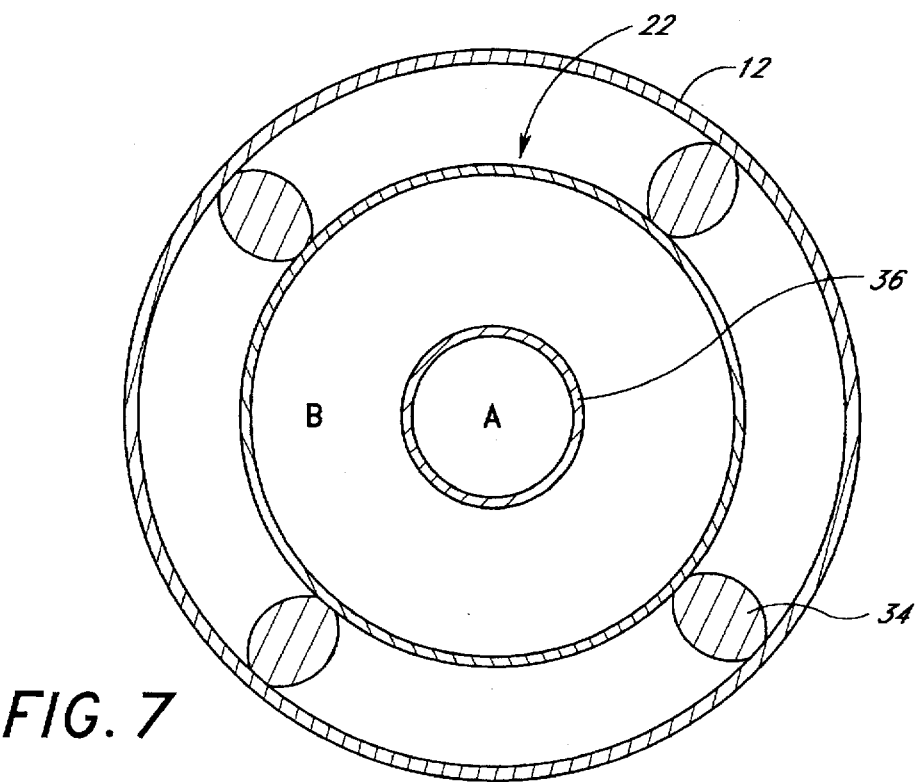
FIG. 7 is an enlarged cross-sectional view taken along line 7—7 of FIG. 3, showing an alternate embodiment of the catalytic device of the system of the present invention.

An alternate embodiment of the system of the present invention is illustrated in FIG. 3, where an alternate catalytic device 22 is employed. Notwithstanding the embodiment illustrated in FIG. 3, the horizontal section of well 12 may be angled downward. In FIG. 3, catalytic device 22 is shown to have an open-ended tube 36 extending out from the end catalytic device 22. Open-ended tube 36 extends through catalytic device 22 and is coupled to standard conduit 27 through a header (not shown). The alternate embodiment of catalytic device 22 is shown in detail in cross-section in FIG. 7. As in the preferred embodiment, catalytic device 22 is supported in the middle of well 12 by a plurality of support rods or knobs 34. Catalytic device 22 comprises a hollow conduit made of catalyst 28, and substantially within the center of catalyst 28 is extended tube 36. In the preferred case of decomposing water, catalyst 28 is made from palladium which absorbs hydrogen into the hollow conduit. The oxygen is unable to diffuse through the palladium tube and continues to drift to the end of the well where the oxygen eventually enters the open end of extended tube 36 as will water, ozone and hydrogen peroxide. The oxygen, ozone and hydrogen peroxide will more easily gravitate to the end of well 12 when the horizontal section of well 12 illustrated in FIG. 3 is angled downward. The oxygen, water, ozone and hydrogen peroxide is pumped back up to the surface through extended tube 36 and then standard conduit 27. The oxygen and ozone will, and the hydrogen peroxide may, be separated out of the mixture before going to the turbine to undergo the exothermic reaction. Such separation may be accomplished by conventional means readily known to those of skill in the art. The hydrogen which diffuses through palladium catalyst 28, rises to the surface through the hollow portion of catalyst 28 and then standard conduit 25 due to the high pressure at the bottom of well 12.

Catalytic device 22 provides two important functions: it harvests and separates the endothermic products, and also removes the products from the reservoir so that the elevated pressure in the reservoir does not oppose the endothermic reaction. A number of substances may catalyze the endothermic reaction. However, the products of the reaction are likely to readily recombine into the reactant(s), under the conditions existing in the well. In addition, the products of the endothermic reaction may be sufficiently reactive, especially at elevated temperatures, to react with the walls of the well or otherwise react in an undesirable manner once they escape from the surface of the catalyst. The products must therefore be collected and separated. Moreover, to the extent that the endothermic reaction provides more moles of product than it consumes moles of reactant, the reaction will be opposed by the high pressure environment that exists in the reservoir or fracture zone. During operation, well 12 will be a column of water which will create a very high pressure at the bottom of the column of water. Since every 10 meters adds 1 atmosphere of pressure, a well drilled to a depth of 3 kilometers would create a pressure of 300 atmospheres at the bottom of well 12. This opposition by the pressure will be a major impediment to the reaction at the bottom of the well, which will be at a significant depth and at an elevated temperature, causing the pressure to be increased significantly. Because catalyst 28 is permeable to the endothermic products, however, the very high pressure will force the products through ceramic material 32 and into respective conduits 24 and 26, and thereby effectively decrease the number of molecules outside catalytic device 22. Thus, the elevated pressure at the bottom of well 12 promotes the endothermic reaction.

Additionally, the elevated pressure at the bottom of well 12 forces the endothermic products up to the earth's surface through porous conduits 24 and 26, and then conduits 25 and 27. Thus, no pumps are required to transport the products up to generating plant 20, although devices such as pumps could be used.

If the decomposition of water is the desired endothermic reaction, the catalyst 28 can be made of a transition metal such as palladium, for example.

Figure 4:
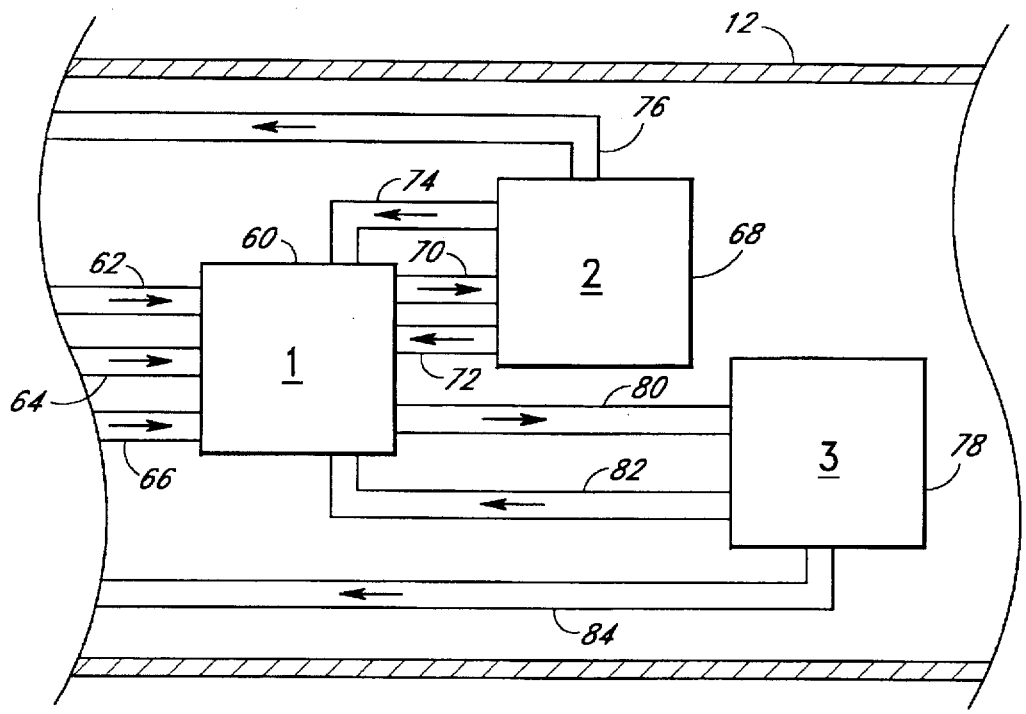
FIG. 4 is a enlarged cross-sectional schematic view of the bottom the well of a second alternative embodiment of the system of the present invention.

An alternative means for inducing the endothermic reaction at the bottom of well 12 is illustrated in FIG. 4. Since the temperature ordinarily necessary for the thermal decomposition of water is not present in the earth's crust at a depth that is currently attainable by practical means, the system illustrated in FIG. 4 does not directly decompose water to hydrogen and oxygen. Instead, the system of FIG. 4 accomplishes the decomposition of water through a sequence of endothermic reactions having sufficiently lower activation energies to produce the desired products. Depending upon the conditions (primarily temperature and pressure) existing at the point of the endothermic reaction, any of several reactions could be used.

One such series of reactions utilizes as a first reaction $2H_2O+SO_2+I_2 \rightarrow H_2SO_4+2HI$ and the products of this first reaction are then decomposed in separate reaction chambers as follows: $2H_2SO_4 \rightarrow 2SO_2+2H_2O+O_2$ and $2HI \rightarrow I_2+H_2$. Thus, the overall endothermic reaction requires not only water, but sulfur dioxide and iodine as well. Therefore, in this alternate embodiment, water, sulfur dioxide, and iodine are transported to the bottom of well 12 into first reaction chamber 60 through individual pipes 62, 64, and 66, respectively.

First reaction chamber 60 produces the hydrogen sulfate which is transported through pipe 70 to second reaction chamber 68 where the hydrogen sulfate is broken down into water, sulfur dioxide, and oxygen. The water and sulfur dioxide is recycled back to the first reaction chamber 60 through pipes 74 and 72, respectively. The resulting oxygen from second reaction chamber 68 is transported back up to the surface by pipe 76. First reaction chamber 60 also produces hydrogen iodine which is transported through pipe 80 to the third reaction chamber 78 where the hydrogen iodine is broken down into iodine and hydrogen. The iodine is recycled back to the first reaction chamber 60 through pipe 82, and the hydrogen is transported back to the surface through pipe 84.

The rate of the series of reactions may be controlled by having valves in the pipes delivering the various compounds to the respective reaction chambers where the valves are controlled from the surface. Although oxygen and hydrogen are the only end products that are transported to the surface, the remaining end products water, sulfur dioxide, and iodine are continually consumed by the series of reactions and reentered into first reaction chamber 60 to produce more hydrogen and oxygen. Although sulfuric acid is produced in the first reaction, the acid is immediately decomposed in the subsequent reaction. Moreover, because the reactions that occur in second reaction chamber 68 and third reaction chamber 78 require a very high temperature, second and third reaction chambers should be located in sections of well 12 that are within fracture zones.

Figure 5:
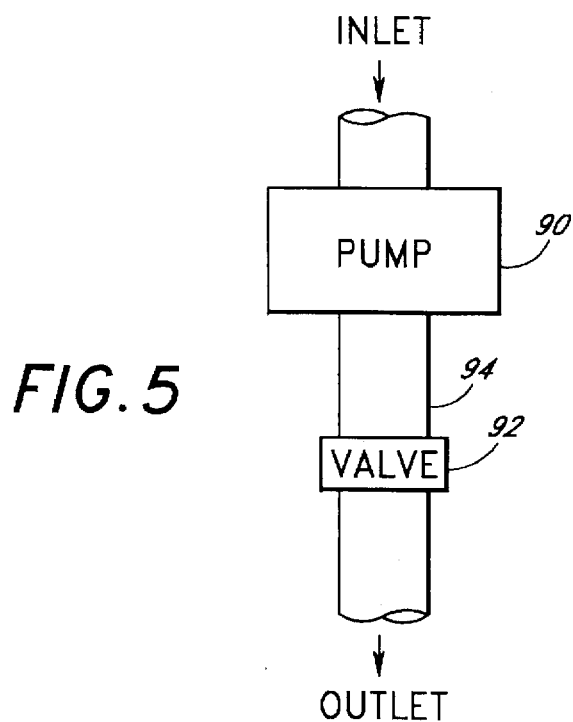
FIG. 5 is an enlarged cross-sectional view of an example pipe used in coupling the chambers illustrated in FIG. 4.

To further illustrate the mechanism of how a compound may be transported from one reaction chamber to another, FIG. 5 is provided. FIG. 5 shows a pump 90 and a valve 92 coupled to transport pipe 94 where the pump 90 and valve 92 are employed to control the deliverance of the gas within example transport pipe 94 to its respective reaction chamber. Although a pump has been shown, it is shown by way of example only, and depending on the various pressures involved, pumps may be needed to facilitate the transport of gases. Pumps are not needed for the transport of gases oxygen and hydrogen through pipes 76 and 84 since the elevated pressure at the bottom of well 12 should cause the oxygen and hydrogen to rise to the surface.

Another reaction that can be used, the "water gas" reaction, $CH_4+H_2O \rightarrow CO+3H_2$, occurs spontaneously at 800° C. However, most such reactions may require oxygen from the air to complete the exothermic reaction and (whether or not they so require air) they may produce, in the course of the subsequent exothermic reaction, carbon dioxide, nitrogen oxides, or some other undesirable product. In addition, efficiency may be lost due to the need to use heat exchangers or other means to handle certain reaction products.

The primary advantage of relying on endothermic reactions in system 10 of the present invention over existing prior art geothermal systems is that system 10 absorbs a greater amount of heat per unit volume through the endothermic reaction than can be captured by the heated brine or steam. For example, the decomposition of a given mass of water captures five to six times the amount of heat that is represented by the same mass of steam. Due to the greater concentration of heat in the present invention, higher temperatures are achieved which improves the efficiency of the exothermic reaction in the turbine and the subsequent generation of electricity.

Additionally, the present invention requires only one well in contrast to the two wells required in prior art schemes. The endothermic reactants may be transported in the same well as the endothermic products since there is no danger that the reactants and products will interact. This is in contrast to previous systems where the injected water could not be transported in the same well as the rising steam for the steam would lose heat to the water, thereby reducing the efficiency of the prior art system. Moreover, the one well used in the present invention is less expensive to drill since the products of the endothermic reaction convey the energy in a comparatively much smaller volume than the steam or brine relied on by past geothermal systems. For example, in previous one-well systems to capture steam or brine from a reservoir, the cross-sectional area of the production well may be 36 inches. Because the present system requires approximately six times less space, the cross-sectional area of the well of the present invention may require, for instance, only 12 inches, 6 inches for injecting the water, and another 6 inches from transporting the hydrogen and oxygen.

Figure 8:
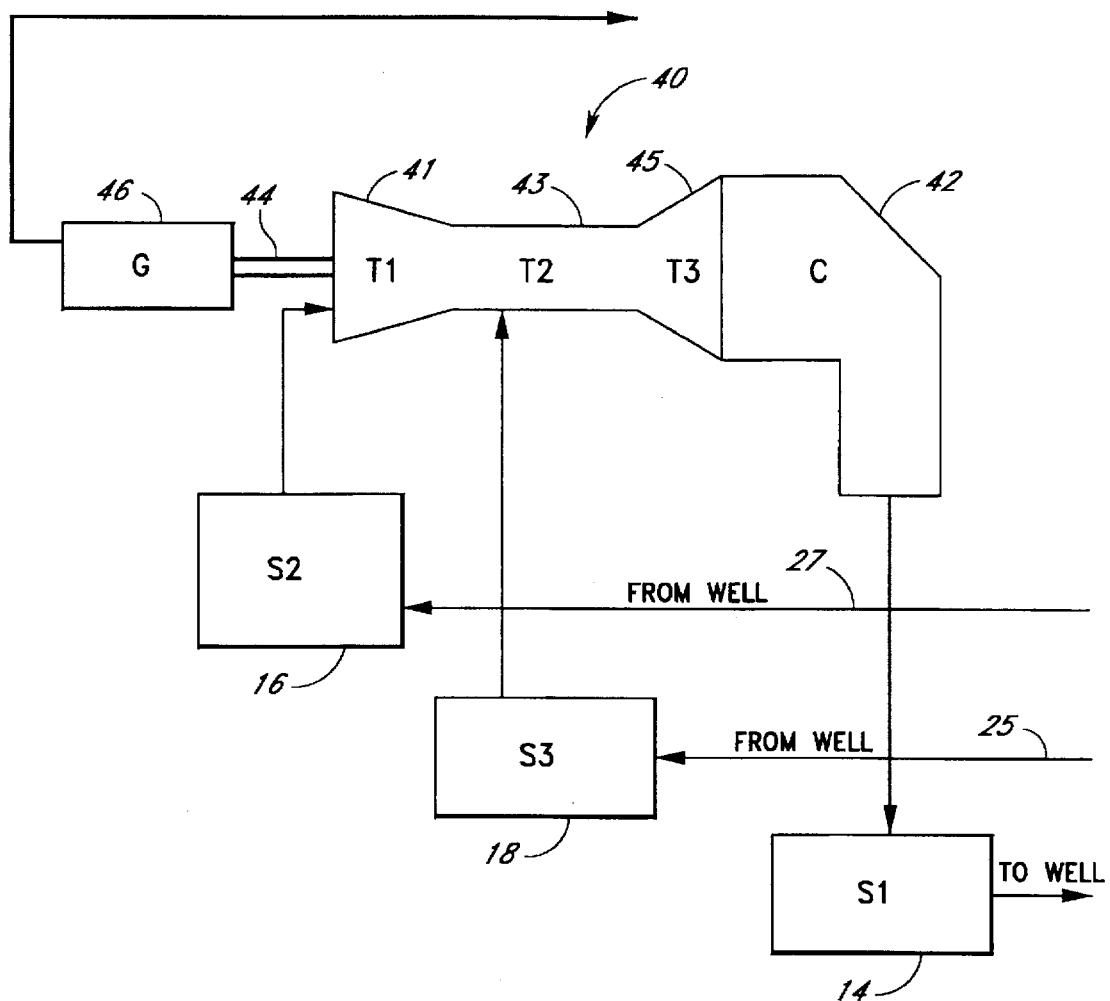
FIG. 8 is a schematic view of the combination turbine used in the system of the present invention.

Referring to FIG. 8, a schematic of the combination turbine 40 which produces the exothermic reaction to release the geothermal heat is illustrated. Combination turbine 40 comprises turbine compressor stage 41, turbine fuel injector and combuster stage 43, turbine power stage 45, and condenser 42. Turbine stages 41, 43 and 45 and condenser 42 are advantageously constructed in a conventional manner as understood by those of ordinary skill in the art. Combination turbine 40 is coupled to generator 46 by generator shaft 44 where the mechanical energy of the rotating generator shaft 44 is converted into electricity in generator 46.

Turbine compressor stage 41 receives exothermic reactant A, which is product A from the endothermic reaction, from storage tank 16 or directly from well 12 through conduit 27. Depending on the type of exothermic reactant A (endothermic product A), the reactant A may not need to be compressed, and thus the compressor stage 41 may not be required. In the preferred embodiment, exothermic reactant A is oxygen. Since the oxygen coming from well 12 is already compressed due to the pressure in well 12, the oxygen should be sufficiently compressed to obviate the need for compressor stage 41. Turbine fuel injector and combustor stage 43 receives exothermic reactant B, which is product B from the endothermic reaction, from storage tank 18, or directly from well 12 through conduit 25. In the preferred embodiment, exothermic reactant B is hydrogen.

In stage 43, exothermic reactant B, i.e., hydrogen, acts as a fuel and combusts when mixed with exothermic reactant A, i.e., oxygen, to create a great amount of heat and produce steam. The resulting energy released by the exothermic reaction is harnessed to turn the blades within power stage 45 which in turn, rotates generator shaft 44. After the exothermic product (steam) has passed through turbine power stage 45, the exothermic product is immediately condensed in condenser 42 where the exothermic vapor product is changed to liquid. The efficiency of the turbine 40 is improved by condensing the exothermic product to remove the back pressure from turbine 40. The condensing of the exothermic product may be accomplished by means known to those of ordinary skill in the art. In the preferred embodiment the steam is condensed to water which is inserted into endothermic reactant storage tank 14 for reintroduction of the water into well 12.

By combining combustion turbine 40 with condenser 42, the combination turbine of the present invention achieves a higher efficiency than previous combustion turbines where a steam turbine is also used in conjunction with a combustion turbine and a condenser. In the preferred embodiment of the present invention, efficiency is increased since the combination turbine does not require a heat exchanger to convert the heat of the exothermic product to steam. In past systems, the arrangement of the combination turbine of the present invention could not be employed since the exothermic product is a largely non-condensible pollutant as opposed to the condensible steam produced in the combination turbine of the present invention.

Furthermore, to the extent that condensation creates a closed loop system where all of the exothermic product is condensed or otherwise captured, it is possible to make productive use of some of the energy that is lost in prior art systems with the exhaust, thus further increasing efficiency. To the same extent, the combination turbine of the present invention avoids releasing pollution into the atmosphere, in contrast to prior art systems. Also, because in the preferred model, the combination turbine is fueled by hydrogen and oxygen which are captive sources, dirt and other impurities that are taken into most combustion turbines from the air is avoided. Since the present invention relies on the endothermic products for conveying the geothermal heat, the products can be stored for use at a later time in contrast to previous systems where the captured steam or brine had to be utilized immediately. Due to this advantage, the combination turbine of the present invention has the added flexibility of operating as a peakload unit to be turned on and off on demand, or as a baseload unit which functions at a constant rate.

Alternatively, the system of the present invention may be used with a conventional combustion turbine, or a boiler with a steam turbine, or the products of the endothermic reaction might be used in a fuel cell.

It will be further be apparent that the products of the endothermic reaction such as, for example, hydrogen and oxygen, are of value and the invention can be used to harvest these products and store them at the surface of the well for uses other than producing electricity.

Further, the invention has utility in environments other than the geothermal well and is useful in any environment, natural or man-made, having suitable temperature and pressure.

Scope of the Invention

The above represents a description of the best mode contemplated of carrying out the present invention, and of the manner and process of making and using it, in such full, clear, concise, and exact terms as to enable any person skilled in the art to which it pertains to make and use the invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed in the following claims, which particularly point out and distinctly claim the subject matter of the invention.

What is claimed is:

1. A system for capturing geothermal heat using endothermic reactions and releasing the heat through exothermic reactions to convert to electricity comprising:
    a well having a top and a bottom, where said well is drilled to a sufficient depth to acquire geothermal heat through the endothermic reactions when reactants are inserted into said well;
    a catalytic device residing within the bottom of said well, said catalytic device for harvesting and separating the products of said endothermic reactions;
    a first and second conduit for transporting the products of the endothermic reaction to the top of said well; and
    a means coupled to said first and second conduits for using the products of the endothermic reactions to create exothermic reactions to generate power.

2. The system of claim 1, wherein said system further comprises a second storage device coupled to said first conduit for storing a first product of the endothermic reactions.

3. The system of claim 1, wherein said system further comprises a third storage device coupled to said second conduit for storing a second product of the endothermic reactions.

4. The system of claim 1, wherein said means coupled to said first and second conduits comprising a comprises a composition turbine coupled to a condenser.

5. The system of claim 4, wherein said turbine further comprises a compressor coupled to the inlet of said turbine.

6. The system of claim 1, wherein said catalytic device comprises a catalyst porous to both first and second products of the endothermic reactions, a first porous conduit within said catalyst for receiving the first product, a second porous conduit within said catalyst for receiving the second product, and a selective material surrounding said second porous conduit where said selective material is porous only to the second product.

7. The system of claim 1, wherein said catalytic device comprises a catalyst porous only to a first product of the endothermic reactions, a first porous conduit within said catalyst for receiving the first product, at least one second porous conduit attached to said catalyst for receiving said second product, and a selective material surrounding said second porous conduit where said selective material is porous only to the second product.

8. The system of claim 1, wherein said catalytic device comprises a catalyst porous only to a first product of said endothermic reaction, and a return conduit extending beyond the end of said catalytic device to retrieve the remaining products of said endothermic reaction, said return conduit impermeable to said first product.

9. The system of claim 1, wherein the endothermic reaction is the decomposition of water.

10. The system of claim 1, wherein the well is drilled down to the fracture zones of hot, dry rock.

11. The system of claim 1, wherein said well is coupled to a first storage tank for storing said reactants of said endothermic reaction.

12. The system of claim 4, wherein the output of said condenser is coupled to a first storage tank.

13. The system of claim 1 wherein said means coupled to said first and second conduits comprises a fuel cell.

14. A system for capturing geothermal heat using endothermic reactions and releasing the heat through exothermic reactions to convert to electricity comprising:
- a well having a top and a bottom, where said well is drilled to a sufficient depth to acquire geothermal heat through the endothermic reactions when reactants are inserted into said well;
- a first chamber located at the bottom of said well for receiving a plurality of reactants, where said reactants produce a first and second product;
- A second chamber located at the bottom of said well for receiving said first product of said first chamber, where said first product decomposes to produce a third, fourth and fifth product, said third and fourth product is transported to said first chamber and said fifth product is transported to the top of said well; and
- a third chamber located at the bottom of said well for receiving said second product of said first chamber, where said second product decomposes to produce a sixth product and seventh product, said sixth product being transported to said first chamber and said seventh product being transported to the top of said well.

15. The system of claim 14, wherein said system further comprises a turbine for receiving said fifth and seventh products to create exothermic reactions to generate power.

16. The system of claim 15, wherein said fifth and seventh products are oxygen and hydrogen.

17. The system of claim 14, wherein said turbine comprises a combustion turbine coupled to a condenser.

18. A system for capturing geothermal heat using endothermic reactions comprising:
- a well having a top and a bottom, where said well is drilled to a sufficient depth to acquire geothermal heat through the endothermic reactions when reactants are inserted into said well;
- a catalytic device residing within said well, said catalytic device for harvesting and separating the products of said endothermic reactions;
- a conduit for transporting the product of the endothermic reaction to the top of said well; and
- a means coupled to said conduit for harnessing the product of the endothermic reaction.

19. A catalytic device for harvesting products of an endothermic reaction comprising:
- a catalyst for inducing an endothermic reaction, where said catalyst is porous to at least one of the products of the endothermic reaction;
- a first and second porous conduit in contact with said catalyst for harvesting and separating the first and second products of the endothermic reaction; and
- a selective material surrounding said second porous conduit where said selective material is porous only to the second product.

20. The device of claim 19, wherein said first and second porous conduit reside within said catalyst.

21. The device of claim 19, wherein said first porous conduit resides within said catalyst, and said second porous conduit resides at the perimeter of said catalyst.

22. A method of capturing geothermal heat using endothermic reactions comprising the steps:
- inserting a reactant into a well, said well being a sufficient depth to acquire geothermal heat through endothermic reactions;
- performing an endothermic reaction in said well using a reactant brought from the surface of said well; and
- harvesting and separating at least two of the products of said endothermic reactions and retrieving them at the surface of said well.

23. A system for capturing and utilizing geothermal heat using endothermic reactions and releasing the heat through exothermic reactions to produce electricity comprising:
- a well having a top and a bottom, where said well is drilled to a sufficient depth to acquire sufficient geothermal heat to promote said endothermic reactions;
- a catalytic device residing within the bottom of said well, said catalytic device for harvesting and separating the products of said endothermic reactions;
- means for supplying water from the top of said well to said catalytic device;
- a first chamber within said catalytic device having walls which are substantially porous to said first product of said endothermic reaction and substantially impermeable to a second product of said endothermic reaction;
- a second chamber within said catalytic device having walls which are substantially porous to said second product of said endothermic reaction;
- first and second conduits respectively coupled to said first and second chambers for transporting the gaseous products of the endothermic reaction to the top of said well, the high pressure environment within said well at the depth of said catalytic device being utilized to force said gaseous products through said catalytic device and through said first and second conduits to the top of said well; and
- a combination turbine coupled to said first and second conduit for using the products of the endothermic reactions to create exothermic reactions for generating electricity.

24. A combination turbine for use in a system for the geothermal production of electricity wherein the geothermal heat produces first and second products at the bottom of a well at a depth at which said geothermal heat is sufficient to cause an endothermic reaction, comprising:
- a combustion turbine for separately receiving said first and second products from the bottom of said well and being driven by the energy released by an exothermic reaction between said first and second products;
- a condenser coupled to said combustion turbine for condensing the product of said exothermic reaction to reduce the back pressure at the output of said combustion turbine.

25. The combination turbine of claim 24, wherein said combination turbine further comprises a compressor coupled to the inlet of said combustion turbine.

26. The combination turbine of claim 24, wherein the products received by said combustion turbine are hydrogen and oxygen and converts the hydrogen and oxygen to steam.

27. The combination turbine of claim 24, wherein said condenser converts said steam to liquid water and returns the liquid water to the system.

* * * * *

UNITED STATES PATENT AND TRADEMARK OFFICE
CERTIFICATE OF CORRECTION

| | |
|---|---|
| PATENT NO. | : 5,697,218 |
| DATED | : December 16, 1997 |
| INVENTOR(S) | : James H. Shnell |

It is certified that error appears in the above-identified patent and that said Letters Patent is hereby corrected as shown below:

<u>Column 16, claim 24,</u>
Line 51, change "products;" to -- products; and --

Signed and Sealed this

Fourth Day of December, 2001

Attest:

NICHOLAS P. GODICI
*Attesting Officer*     *Acting Director of the United States Patent and Trademark Office*